United States Patent [19]
Hanson

[11] Patent Number: 5,482,074
[45] Date of Patent: Jan. 9, 1996

[54] SAFETY CUT-OFF DEVICE FOR PIPING SYSTEMS AND THE LIKE

[76] Inventor: David J. Hanson, 1409 Stagner Dr., Carlsbad, N.M. 88220

[21] Appl. No.: 249,600

[22] Filed: May 26, 1994

[51] Int. Cl.⁶ .................................................. F16K 17/36
[52] U.S. Cl. ............................................. 137/45; 251/66
[58] Field of Search ................................. 137/38, 39, 45; 251/66

[56] References Cited

U.S. PATENT DOCUMENTS

| 2,054,563 | 9/1936 | Hansen . | |
|---|---|---|---|
| 2,158,753 | 5/1939 | Hansen . | |
| 3,346,232 | 10/1967 | Cator | 251/66 |
| 3,888,271 | 6/1975 | Pettit . | |
| 3,890,993 | 6/1975 | MacNeilage . | |
| 3,927,689 | 12/1975 | Sharp et al. . | |
| 3,994,359 | 11/1976 | Smitley | 137/38 X |
| 4,103,697 | 8/1978 | Kiesow . | |
| 4,131,124 | 12/1978 | Sunde . | |
| 4,353,383 | 10/1982 | Kiesel . | |
| 4,542,760 | 9/1985 | Flauiani . | |
| 4,546,660 | 10/1985 | Bujold . | |
| 4,549,870 | 10/1985 | Wass . | |
| 4,821,759 | 4/1989 | Diamond . | |
| 4,971,094 | 11/1990 | Gonzalez | 137/38 |
| 5,119,841 | 6/1992 | McGill | 251/66 X |

FOREIGN PATENT DOCUMENTS

| 72777 | 4/1983 | Japan | 137/45 |

Primary Examiner—Robert G. Nilson
Attorney, Agent, or Firm—Shlesinger, Arkwright & Garvey

[57] ABSTRACT

A safety cut-off device, comprises a valve for controlling fluid flow. The valve has a body with a passageway therethrough and inlet and outlet communicating with the passageway. The valve includes a closure member disposed within the passageway, the closure member having an open position for permitting fluid flow through the body and a closed position for shutting off the fluid flow. A stop has an operative position engaging the closure member in the open position and an inoperative position when the closure member is in the closed position. The stop is biased in the operative position. A vibration sensitive member is secured to the valve body, the vibration sensitive member being adapted to move the stop to the inoperative position in response to vibrations in the environment, whereby the closure member is permitted to move to the closed position.

21 Claims, 2 Drawing Sheets

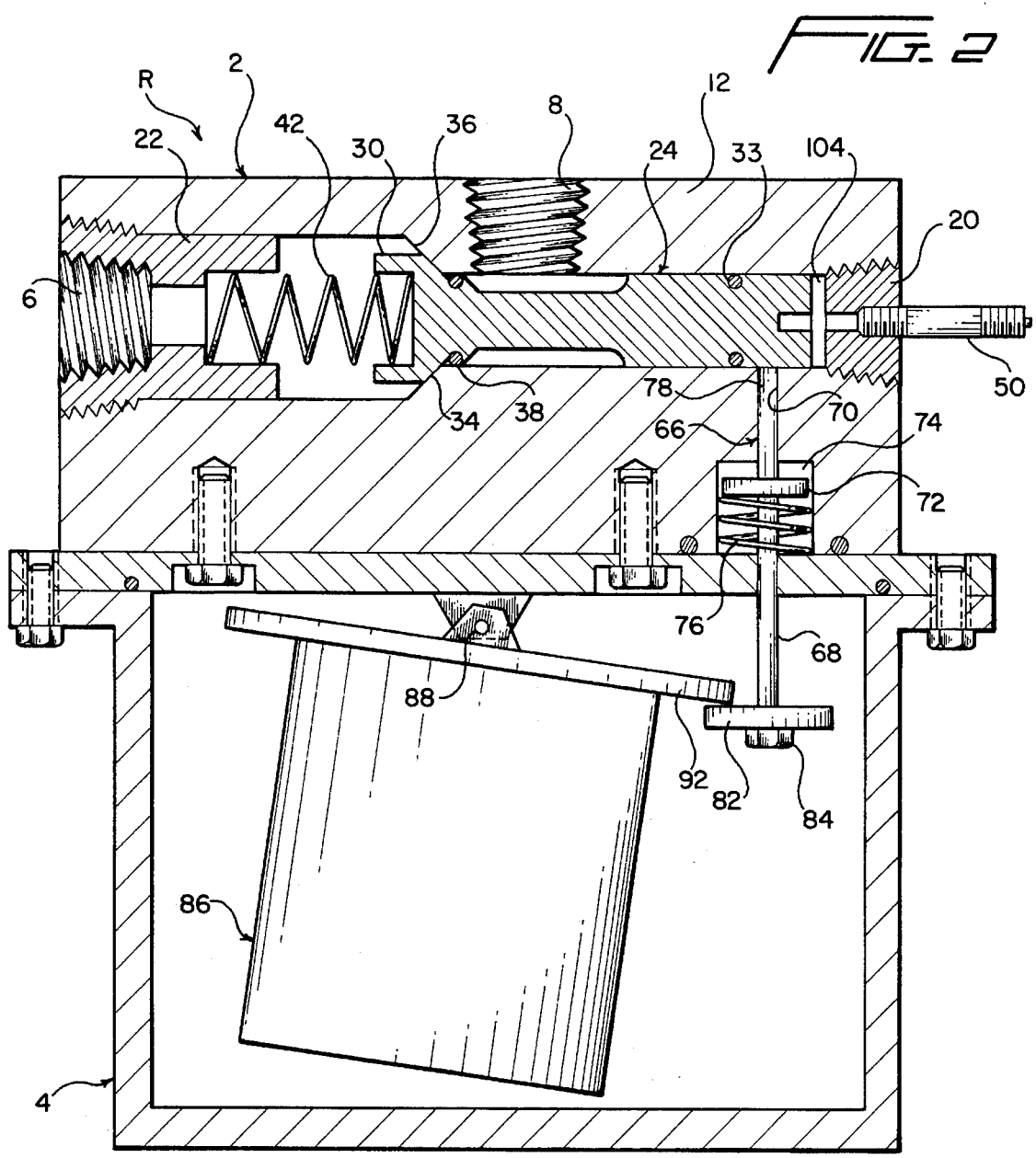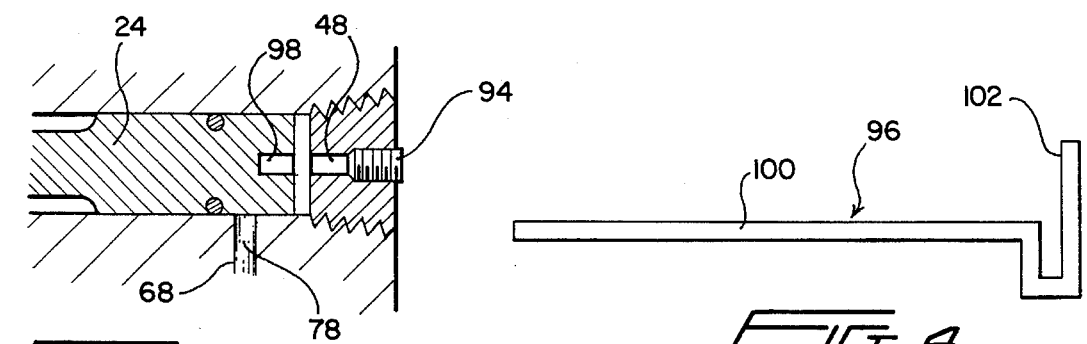

SAFETY CUT-OFF DEVICE FOR PIPING SYSTEMS AND THE LIKE

FIELD OF THE INVENTION

The present invention generally relates to a safety valve for automatically closing off a fluid line conveying natural gas, water, fuel, etc. during an emergency such as an earthquake or other similar event. The present invention pertains specifically to a valve that has stored energy for closure that is released by a trigger activated by a pendulum caused to swing from earthquake motions or the like.

BACKGROUND OF THE INVENTION

Earthquakes frequently rapture piping systems carrying gas, oil, water and other fluids, thereby causing severe safety hazards. In some cases damage caused by earthquakes is magnified by subsequent fires caused by broken gas mains. Therefore, it is important that the flow of natural gas or other flammable fluids in piping systems or the like be automatically stopped as soon as earthquake is detected. The danger of explosion and fires resulting from gas escaping from broken pipelines can therefore be averted.

Various safety devices have been proposed in the past to shut-off gas flow upon occurrence of an earthquake. However, prior art devices suffer from several deficiencies. Some are not tamper-proof. Others are not hermetically sealed to prevent the internal components from deterioration from moisture, dust, corrosion, etc. Still others are relative too sensitive to minor disturbances. Also, some prior art valves are relatively easily reset, which may cause additional danger not apparent to the untrained user.

In view of the above, there is therefore a need for a safety cut-off device that will respond to earthquake shocks or other similar motions to stop the flow of gas, oil, or other fluids deemed necessary to mitigate fire hazards or other safety related risks after the occurrence of an earthquake, without the shortcomings of prior art devices.

OBJECTS AND SUMMARY OF THE INVENTION

It is an object of the present invention to provide a safety cut-off device that is designed to close automatically in the event of an earthquake or other disturbances.

It is another object of the present invention to provide a safety cut-off device that may be installed between the gas supply street service and the gas regulator and meter going to a home or building without substantial alterations to the existing piping system.

It is still another object of the present invention to provide a safety cut-off device that will stop the flow of liquid fuels such as oil and gasoline as well as toxic liquids and gases in the event of an earthquake.

It is yet another object of the present invention to provide a safety cut-off device that can be installed anywhere where valve closure is required when there is motion, such as in a chemical process plant, etc.

It is another object of the present invention to provide a safety cut-off device that is tamper resistant, since all the working components are enclosed in a hermetically sealed housing.

It is still another object of the present invention to provide a safety cut-off device that permits inspection and manual activation of its critical components that respond to the earthquake or other similar events.

It is yet another object of the present invention to provide a safety cut-off device that can only be reset after activation by trained personnel, thereby promoting additional safety by having a trained personnel on site to determine the advisability of turning the device back on.

It is another object of the present invention to provide a safety cut-off device that is activated only after a threshold force is reached, thereby providing minimizing unnecessary activations.

It is yet another object of the present invention to provide a safety cut-off device that provides access to the trigger mechanism for maintenance and testing while the device is connected to the piping system.

In summary, the present invention provides a safety cut-off device that provides several features not found in prior art valves.

This and other objects of the present invention will become apparent from the following detailed description.

BRIEF DESCRIPTION OF THE DRAWINGS

FIG. 2 is a cross-sectional view of the device of FIG. 1 in the closed position.

FIG. 3 is a fragmentary cross-sectional view of an access plug used to reset the device of FIG. 1 after activation.

FIG. 4 is plan view of a tool used to reset the device of FIG. 1 after activation.

DETAILED DESCRIPTION OF THE INVENTION

Figure 1:
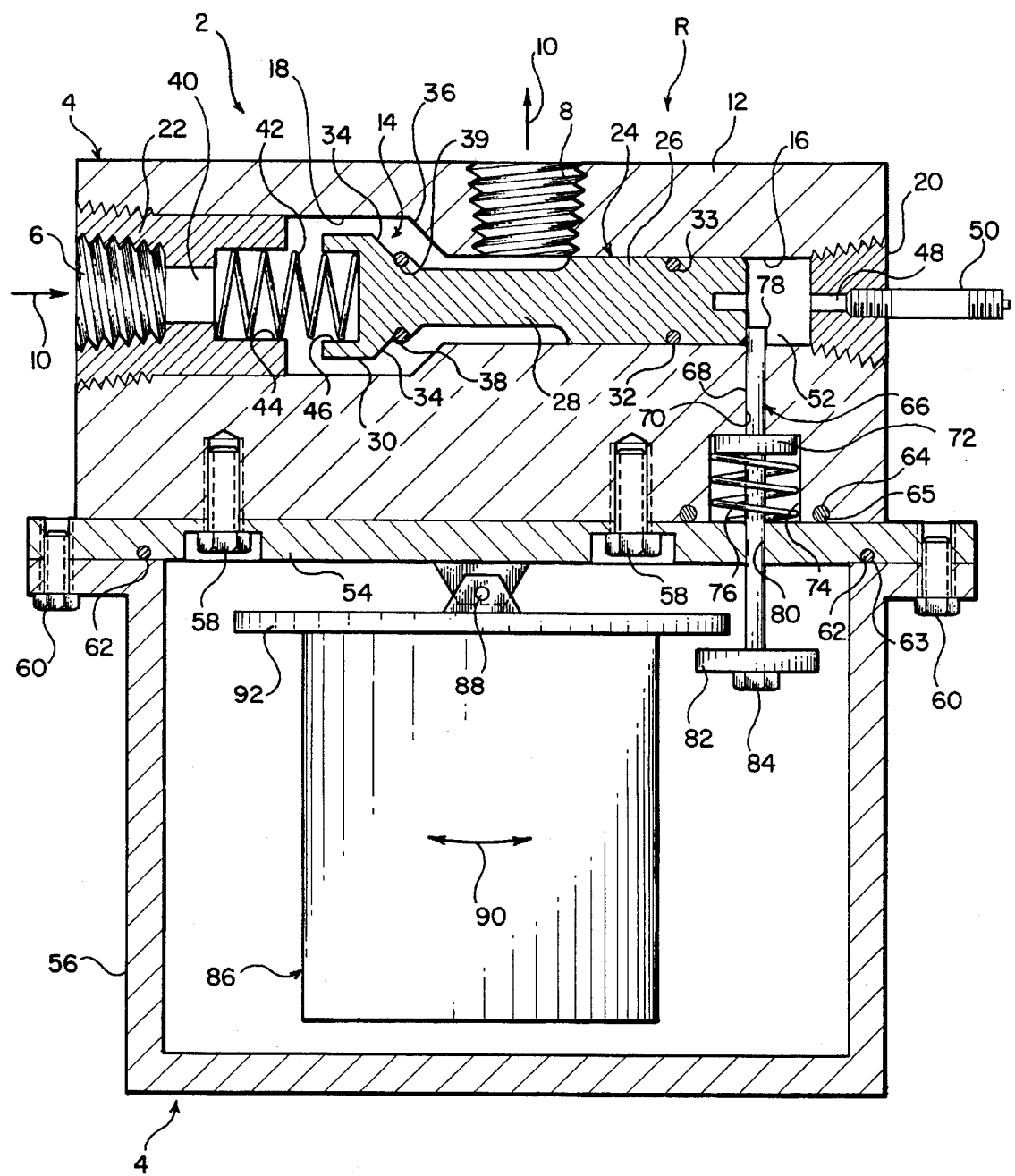
FIG. 1 is a cross-sectional view of a safety cut-off device in the open position in accordance with the present invention.

A safety cut-off device R in accordance with the present invention is disclosed in FIG. 1. The device R is adapted to be connected to a piping system (not shown) to control fluid flow therethrough. The device R comprises a valve 2 and a trigger mechanism 4 that automatically closes the valve 2 in the event of an earthquake or other undesired motions. The valve 2 has threaded inlet 6 and a threaded outlet 8 to permit fluid flow in the direction generally indicated by the arrows 10. The threads of the inlet 6 and outlet 8 are advantageously tapered for leak-proof connection to the piping system.

The valve 2 has a body 12 which has a through opening 14 with a narrow portion 16 and a wide portion 18. The opening 14 is threaded at its narrow end to receive a guide bushing 20 and is threaded at its wide end to receive an inlet bushing 22. The threads of the opening 14 are advantageously tapered for leak-proof connections.

A spool or closure member 24 is slidably received within the opening 14, as best shown in FIG. 1. The spool member 24 has a wide portion 26, a narrow intermediate portion 28 and a flange portion 30. The narrow portion 28 is slidably received within the narrow portion 16 of the opening 14 which guides the spool member 24 between the open and closed positions relative to the inlet 6 and outlet 8. A ring seal 32 carried by the narrow portion 28 in a cooperating groove 33 advantageously provides sealing means against leakage. The narrow portion 28 transitions into the flange portion 30 with conical surface 34 that mates with a corresponding conical surface 36 in the opening 14. A ring seal 38 carried by the spool member 24 in a cooperating groove 39 provides sealing means between the inlet 6 and the outlet 8 when the spool member 24 is in the closed position, as best shown in FIG. 2.

The inlet bushing 22 has an opening 40 that communicates with the opening 14 and the outlet 8. A spring 42 is disposed between the inlet bushing 22 and the flange portion 30 of the spool member 24, as best shown in FIG. 1.

A recess 44 disposed in the inlet bushing 22 and a corresponding recess 46 disposed in the flange portion 30 advantageously secure the spring 42 in place, as best shown in FIG. 1. The spring 42 is advantageously under compression such that the spool member 24 is biased toward the closed position, thereby causing the spool member 24 to the closed position when activated. The spring 42 under compression has sufficient stored energy to move the spool member 24 to the closed position upon activation, as best shown in FIG. 2.

The inlet bushing 22 is advantageously removable such that various pipe sizes may be adapted to the device R. The removability of the inlet bushing 22 also provides for the assembly of the spool member 24 and the spring 42.

The guide bushing 20 has a passageway 48 that communicates with an air valve 50, as best shown in FIG. 1. The air valve 50 advantageously permits introduction of compressed dry air, nitrogen or other suitable gases into the chamber 52 when resetting the device R after activation.

A mounting plate 54 secures a trigger housing or enclosure 56 to the valve body 12 by means of a plurality of bolts 58 and 60, as best shown in FIG. 1. A seal 62 disposed in corresponding groove 63 advantageously provides a hermetic seal to the components within the housing 56. Seal 64 disposed in corresponding groove 65 provides sealing means against any fluid that may leak beyond the seal 32.

A trigger assembly 66 keeps the spool member 24 in the open position, as best shown in FIG. 1. The trigger assembly 66 comprises a shaft 68 slidably disposed in a corresponding opening 70 in the valve body 12. A radial flange 72 is rigidly secured to the shaft 78 and is received within a larger opening 74 in the body 12. A spring 76 disposed within the opening 74 urges the flange 72 and the shaft 68 in the upward or operative position, as best shown in FIG. 1. An end portion 78 of the shaft 68 is disposed within the chamber 52 and provides a stop for the spool member 24 against the compressive force of the spring 42. An opening 80 in the mounting plate 54 slidably receives the shaft 68 and thereby provides further support thereto. A washer 82 is supported at the other end of the shaft 68 by a nut 84.

A pendulum or vibration sensitive member 86 is pivotably secured from the mounting plate 54 by means of a pin 88, thereby permitting the pendulum 86 to oscillate in the direction generally indicated at 90 during an earthquake disturbance or during the occurrence of unwanted motion. The pendulum 86 has a flange 92 that overlies the washer 82, as best shown in FIG. 1.

The air valve 50 may be replaced with a removable threaded plug 94, as best shown in FIG. 3. The plug 94 is removed to permit a reset tool 96 to be inserted into the opening 48 and engage the spool member 24 in a recess 98, as best shown in FIG. 3. The tool 96 has a rod portion 100 that is adapted to be inserted into the opening 48 and engage the recess 98 such that a user controlling a handle portion 102 may push the spool member 24 past the shaft 68 when resetting the device R after activation.

In operation, the device R is normally in the open position to permit fluid flow through the piping system, as best shown in FIG. 1. The trigger 66 assembly keeps the spool member 24 in the open position against the compressive force of the spring 42. The outer edge of the spool member 24 abuts against the end portion 78 of the shaft 68 that is disposed within the chamber 52, thereby preventing the spool member 24 from closing. The spring 76 holds the shaft 68 in the upward or operative position to thereby permit the end portion 78 to act as a stop for the spool member 24.

During occurrence of an earthquake or other motions, the pendulum 86 will swing about the pin 88. The flange portion 92 of the pendulum 86 will strike the underlying washer 82 of the trigger 66. If there is enough force in the earthquake, which is then imparted to the movement of the pendulum 86, the flange 92 will push the shaft 68 by means of the washer 82 downwardly and depress the spring 76, as best shown in FIG. 2. As soon as the end portion 78 of the shaft 68 is retracted into the opening 70, the spring 42 will immediately push the spool member 24 to the right in the closed position, thereby shutting off fluid flow through the inlet 6, as best shown in FIG. 2.

The conical surface 34 of the spool member 24 cooperates with the conical surface 36 of the opening 14 to stop fluid flow through the outlet 8. The seal 38 seals against leakage past the conical surfaces 34 and 36. In addition to the spring 42 pressing the flange portion 30 against the conical surface or valve seat 36, the fluid pressure in the piping system further contributes to effective closure of the valve 4, since the conical surfaces 34 and 36 open up toward the inlet 6, as best shown in FIG. 2. A small gap 104 is maintained between the spool member 24 and the guide bushing 20 to advantageously ensure complete seating of the conical surface 34 against the conical surface or valve seat 36, as best shown in FIG. 2.

It will be understood by persons of ordinary skill in the art that certain amount of force would be required to activate the trigger 66, since the spring 76 has to be compressed to retract the stop 78 into the opening 70. This feature is advantageously used to screen out unwanted activations due to minor disturbances. Conversely, the proper choice of the spring 76 can make the device R sensitive to minor motions. Thus, by using springs with different characteristics, the force required to activate the device may be changed to suit a specific application. Further, the position of the washer 82 may be adjusted relative to the distance to the pendulum flange 92 by appropriately adjusting the nut 84. In this manner, the activation of the trigger 66 may be adjusted to the expected amplitude of motion of the pendulum 86 during an earthquake.

The trigger 66 and the pendulum 86 are advantageously hermetically sealed within the housing 56. This advantageously provides for a tamper-proof device. Further, since the critical components of the device R are advantageously protected from moisture, dust, corrosion and other environmental degradations, deterioration of the components over time is minimized. The hermetically sealed components would therefore be expected to function reliably even after very long periods of time of inactivity.

The housing 56 is relatively easy to remove by undoing the securing bolts 60. This can be done without disconnecting the valve 2 from the piping system. Thus, the trigger assembly 66 and the pendulum 86 can be visually and manually checked. Manual activation of the trigger assembly 66 for testing is advantageously done by pulling the shaft 68 downwardly against the spring 76.

The device R, once it is activated, can only be reset by trained personnel to ensure that a complete safety assessment is made before the device is turned back on. To reset the device R, a source of dry compressed air or nitrogen or other inert gases (not shown) is connected to the air valve 50 and introduced in the gap 104, causing the spool member 24 to move to the open position and compress the spring 42, as best shown in FIG. 1. Where a plug 94 is used, the plug is removed and the tool 96 is inserted in the opening 4. The user then pushes the spool member 24 to the open position past the shaft end portion 78, which is automatically extended by means of the spring 76. Once in the open position, the device R is then ready to respond to the next earthquake or such other similar events.

The device R, including the valve 4 is advantageously made from standard materials suitable for the fluid being controlled.

The device R may also be used in a process system where closure of the valve 4 is required when unwanted motion is detected.

In addition to controlling flammable fluids, it may also be used to shut off water service to dwellings and billings, such that in the event of an earthquake, water pressure lost is minimized due to broken water pipes within the structures.

The valve 4 is a positive action device since the spring 42 provides closure force to keep the valve closed.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A safety cut-off device, comprising:
   a) a valve for controlling fluid flow;
   b) said valve including a body having a passageway therethrough;
   c) said valve having inlet and outlet communicating with said passageway for permitting fluid flow therethrough;
   d) said valve including a closure member disposed within said passageway, said closure member having an open position for permitting fluid flow through said body and a closed position for shutting off the fluid flow;
   e) a stop having an operative position engaging said closure member in the open position and an inoperative position when said closure member is in the closed position, said stop being biased in the operative position;
   f) a vibration sensitive member secured to said valve body, said vibration sensitive member being adapted to move said stop to the inoperative position in response to vibrations in the environment, whereby said closure member is permitted to move to the closed position;
   g) said stop including a member adapted to engage with said vibration sensitive member thereby to move said stop to the inoperative position, said vibration sensitive member being spaced apart from said stop member; and
   h) said stop is biased in the operative position in engagement against said closure member in the open position.

2. A safety cut-off device as in claim 1, wherein:
   a) said closure member is spring biased toward the closed position against said stop.

3. A safety cut-off device as in claim 1, wherein:
   a) said stop is spring biased in the operative position in engagement against said closure member in the open position.

4. A safety cut-off device as in claim 1, wherein:
   a) said stop is slidably movable between the operative and inoperative positions.

5. A safety cut-off device as in claim 4, wherein:
   a) said vibration sensitive member is pivotably secured to said body and effective to slidably move said stop to the inoperative position.

6. A safety cut-off device as in claim 1, wherein:
   a) said closure member includes a portion in sealing relationship with a portion of said passageway; and
   b) an inlet for compressed gas in communication with said passageway portion for pushing and resetting said closure member in the open position after activation.

7. A safety cut-off device as in claim 6, wherein:
   a) said compressed gas inlet includes an air valve.

8. A safety cut-off device as in claim 1, wherein:
   a) said closure member includes a portion in sealing relationship with a portion of said passageway; and
   b) said passageway portion includes a bushing including a removable plug to permit a tool to be inserted into said passageway portion and in engagement with said closure member portion to push said closure member to the open position.

9. A safety cut-off device, comprising:
   a) a valve for controlling fluid flow;
   b) said valve including a body having a passageway therethrough;
   c) said valve having inlet and outlet communicating with said passageway for permitting fluid to flow therethrough;
   d) said valve including a spool member disposed within said passageway, said spool member being slidable within said passageway between an open position for permitting fluid flow through said body and a closed position for shutting off the fluid flow, said spool member being biased toward the closed position;
   e) a stop having an operative position engaging one end of said spool member in the open position and an inoperative position when said spool member is in the closed position, said stop being biased toward the operative position;
   f) a pendulum secured to said valve body, said pendulum being adapted to move said stop to the inoperative position in response to vibrations in the environment, whereby said spool member is permitted to move to the closed position and
   g) a spring for biasing said shaft into said passageway.

10. A safety cut-off device as in claim 9, wherein:
    a) said inlet includes a bushing;
    b) said bushing includes a first recess;
    c) said spool member includes a second recess disposed toward said first recess; and
    d) a spring with end portions disposed in respective first and second recesses.

11. A safety cut-off device as in claim 10, wherein:
    a) said bushing is removable.

12. A safety cut-off device as in claim 9, wherein:
    a) said spool member includes a portion slidably received in said passageway; and
    b) said stop includes a shaft having an end portion projecting into said passageway and abutting said spool member portion.

13. A safety cut-off device as in claim 12, wherein:

a) said stop includes a flange secured to one end of said shaft; and b) said pendulum includes a flange for pushing said shaft flange downwardly thereby to compress said spring and retract said shaft end portion from said passageway.

14. A safety cut-off device as in claim 9, wherein:

a) said spool member includes a first conical surface;

b) said passageway includes a second conical surface; and c) said first and second conical surfaces engage in sealing contact when said spool member is in the closed position such that fluid flow from said inlet is cut off.

15. A safety cut-off device as in claim 14, wherein:

a) said first and second conical surfaces are oriented such that fluid pressure pushes said first conical surface against said second conical surface.

16. A safety cut-off device as in claim 9, wherein:

a) said spool member includes a portion in sealing relationship with a portion of said passageway; and b) an inlet for compressed gas in communication with said passageway portion for pushing and resetting said spool member in the open position.

17. A safety cut-off device for shutting off fluid flow in a piping system, comprising:

a) a valve;

b) said valve including a body having a passageway therethrough;

c) said valve having inlet and outlet communicating with said passageway for connecting to the piping system, thereby permitting fluid flow therethrough;

d) said valve including a closure member disposed within said passageway, said closure member being slidable within said passageway between an open position for permitting fluid flow through said body and a closed position for shutting off the fluid flow;

e) an airtight removable enclosure secured to said body;

f) a trigger assembly disposed within said enclosure and operably connected to said closure member, said trigger assembly having an operative position for maintaining said closure member in the open position and an inoperative position when said closure member is in the closed position;

g) said trigger assembly being responsive to vibration in the environment such that said trigger assembly releases said closure member to the closed position upon occurrence of vibration in the environment; and h) said trigger assembly being exposed for inspection and manual activation when said enclosure is detached from said body while said valve remains connected to the piping system.

18. A safety cut-off device as in claim 17, wherein:

a) said stop includes a shaft slidably received in said body; and b) said shaft includes a portion extending beyond said body and within said enclosure.

19. A safety cut-off device as in claim 18, wherein:

a) said shaft is disposed transversely of said closure member such that said shaft underlies said closure member when said closure member is in the closed position.

20. A safety cut-off device as in claim 17, wherein:

a) a spring for biasing said closure member toward the closed position; and b) said spring is under compression when said closure member is in the closed position.

21. A safety cut-off device, comprising:

a) a valve for controlling fluid flow;

b) said valve including a body having a passageway therethrough;

c) said valve having inlet and outlet communicating with said passageway for permitting fluid flow therethrough;

d) said valve including a closure member disposed within said passageway, said closure member having an open position for permitting fluid flow through said body and a closed position for shutting off the fluid flow;

e) a stop having an operative position engaging said closure member in the open position and an inoperative position when said closure member is in the closed position, said stop being biased in the operative position;

f) a vibration sensitive member secured to said valve body, said vibration sensitive member being adapted to move said stop to the inoperative position in response to vibrations in the environment, whereby said closure member is permitted to move to the closed position;

g) said closure member including a portion in sealing relationship with a portion of said passageway; and h) an inlet for compressed gas in communication with said passageway portion for pushing and resetting said closure member in the open position after activation.

* * * * *